United States Patent
Blumenau

[19]

[11] Patent Number: 5,926,836
[45] Date of Patent: Jul. 20, 1999

[54] COMPUTER AND ASSOCIATED METHOD FOR RESTORING DATA BACKED UP ON ARCHIVE MEDIA

[75] Inventor: Steven M. Blumenau, Holliston, Mass.

[73] Assignee: EMC Corporation, Hopkinton, Mass.

[21] Appl. No.: 08/753,952

[22] Filed: Dec. 3, 1996

[51] Int. Cl.⁶ .......................... G06F 12/16; G06F 13/00; G06F 11/08
[52] U.S. Cl. ........................... 711/162; 395/182.04
[58] Field of Search .................... 711/161, 162, 711/202, 203; 395/182.04, 182.13, 183.18; 371/40.1, 40.2

[56] References Cited

U.S. PATENT DOCUMENTS

| | | | |
|---|---|---|---|
| 5,235,601 | 8/1993 | Stallmo et al. | 371/40.4 |
| 5,293,617 | 3/1994 | Okada | 711/162 |
| 5,305,438 | 4/1994 | MacKay et al. | 345/511 |
| 5,337,414 | 8/1994 | Hashemi et al. | 395/872 |
| 5,390,187 | 2/1995 | Stallmo | 395/182.05 |
| 5,398,253 | 3/1995 | Gordon | 371/40.4 |
| 5,435,004 | 7/1995 | Cox et al. | 707/205 |
| 5,463,772 | 10/1995 | Thompson et al. | 707/101 |
| 5,495,607 | 2/1996 | Pisello et al. | 707/10 |
| 5,497,457 | 3/1996 | Ford | 395/182.04 |
| 5,499,337 | 3/1996 | Gordon | 395/182.04 |
| 5,504,858 | 4/1996 | Ellis et al. | 395/182.04 |
| 5,649,158 | 7/1997 | Lahr et al. | 711/161 |

*Primary Examiner*—Glenn Gossage
*Attorney, Agent, or Firm*—Fish & Richardson P.C.

[57] ABSTRACT

A computer having restore capabilities for data backed up on archive media, the computer including a restore application which identifies the target data to be restored from the archive media and makes logical user read and write requests, an interpreter that does logical to physical mapping and maps logical user read and write requests to physical block level read and write requests, a host storage driver having a disk driver interface for receiving block level read and write requests from the interpreter, a host storage disk connected to be controlled by the host storage driver, and a restore system having a disk driver interface to the interpreter for receiving block level read requests from the interpreter, the restore system issuing instructions to read data from archive media at a block, physical level and returning the data obtained from the archive media to the interpreter.

30 Claims, 5 Drawing Sheets

5,926,836

COMPUTER AND ASSOCIATED METHOD FOR RESTORING DATA BACKED UP ON ARCHIVE MEDIA

CROSS REFERENCE TO RELATED APPLICATIONS

Patent applications entitled "Backing Up Computer Data" Ser. No. 08/757,125, "Mirroring Computer Data" Ser. No. 08/757,123, "Redundant Storage of Computer Data" Ser. No. 08/757,122, and "Hierarchical Performance System" Ser. No. 08/757,124 filed concurrently herewith, are incorporated herein by reference.

BACKGROUND OF THE INVENTION

The invention relates to the restoration of data backed up on archive media.

Computer data are often backed up on tape or optical archive media on a periodic basis, e.g., daily in some computer systems. This permits the recovery of the data as they existed at some point in time in the event of system failure or inadvertent loss of data.

In general there are two ways to back up data: physical level backup and logical level backup. The term "physical level" refers to the data as stored at specific locations on some physical media, e.g., a host computer disk. The term "logical level" refers to the data as seen by the user application programs in files or database tables. Typically, the computer's operating system (e.g., UNIX (AT&T Bell Laboratories Operating System) or Disk Operating System (DOS)) includes a file system that does mapping between the physical level and the logical level.

Physical level backup involves making a raw copy from a computer disk to an archive media, e.g., a tape. The data can be backed up and restored quickly because there is no need to go through an interpreter (e.g., a file system of an operating system), but one is unable to interpret the physical information or raw data in order to restore just one file or database table. Thus, one must restore additional unneeded data backed up at the same time in order to obtain a single file or database table. One approach that avoids the restoration of additional unneeded data has been to write an application that emulates the interpretation of the particular file system employed on a computer to do physical to logical mapping.

Logical level backup involves using an interpreter (e.g., a file system) while doing backup, and thus the backup is very slow owing to the need to do physical to logical mapping. However, with logical level backup, a single file or database table can be easily restored without the need to restore unneeded data backed up at the same time.

SUMMARY OF THE INVENTION

In one aspect, the invention features, in general, a computer having restore capabilities for data backed up on archive media. The computer includes the usual components of an interpreter (e.g., a file system of an operating system or a database application that does physical to logical mapping), a host storage disk, and a host storage driver for the host storage disk. In addition, the computer includes a restore application and a restore system. The restore application identifies the target data to be restored from the archive media and makes logical user read and write requests. The interpreter does logical to physical mapping and maps logical user read and write requests to physical block level read and write requests. The host storage driver has a disk driver interface for receiving block level read and write requests from the interpreter and generates disk control signals to read and write blocks of data from the host storage disk in response to the block level read and write requests. The restore system has a disk driver interface to the interpreter for receiving block level read requests from the interpreter, issues instructions to read data from archive media at a block, physical level, and returns the data obtained from the archive media to the interpreter.

In another aspect, the invention features, in general, a computer implemented method of restoring data backed up from a computer on archive media. A restore application on the computer identifies the target data to be restored from the archive media and makes logical user read and write requests to copy the target data from the archive media to a host storage disk controlled by a host storage driver. An interpreter of the computer maps logical user read and write requests to physical block level read and write requests. A restore system having a disk driver interface to the interpreter receives the block level read requests from the interpreter, issues instructions to read data from archive media at a block, physical level, and returns the data obtained from the archive media to the interpreter. The data obtained from the archive media are written on the host storage disk.

In another aspect, the invention features a computer program that resides on a computer-readable medium and includes instructions causing the computer to create a restore application and restore system for interaction with an interpreter, host storage disk, and host storage driver of the computer. The restore application identifies the target data to be restored from the archive media and makes logical user read and write requests to the interpreter. The restore system has a disk driver interface to the interpreter for receiving the block level read requests from the interpreter, issues instructions to read data from archive media at a block, physical level, and returns the data obtained from the archive media to the interpreter. Certain implementations of the invention may include one or more of the following features. In certain implementations: the interpreter is a file system of the computer's operating system or, alternatively, the interpreter is a database server application that does physical to logical mapping; the restore system includes a restore driver and an archive media system, and the restore driver providing the driver interface and also having an operating system device driver application programming interface to the archive media system, the archive media system being implemented in user space of the computer and communicating with external archive media; there also is a restore control program that identifies archive media on which the target data are located and communicates this information to the archive media system; the archive media system and the restore application communicate via input output control (IOCTL) messages; the restore application issues instructions to the file system to open an input file for the target data on the archive media, to open an output file for the target data on the host disk, and to copy the input file to the output file; the archive media system has a local cache for storing data from the archive media; the local cache also stores data written to it from the restore driver; and the archive media system communicates with a tape library.

Embodiments of the invention may include one or more of the following advantages. One can obtain the benefits of physical level backup at raw physical speeds but restore a subset of backed up data, e.g., a single file, directory, or other group of files, or a single database table, or even a single row or a single column within a row. The use of the computer's interpreter to do the physical to logical mapping permits the approach to be portable across computers with different interpreters; e.g., where the interpreter is a file system, the approach can be employed on different operating systems or with operating systems with different internal implementations, and where the interpreter is a database server application that does physical to logical mapping, the approach can be used with different database server applications.

Other advantages and features of the invention will be apparent from the description of preferred embodiments of the invention and from the claims.

DESCRIPTION OF THE PREFERRED EMBODIMENTS

Figure 1:
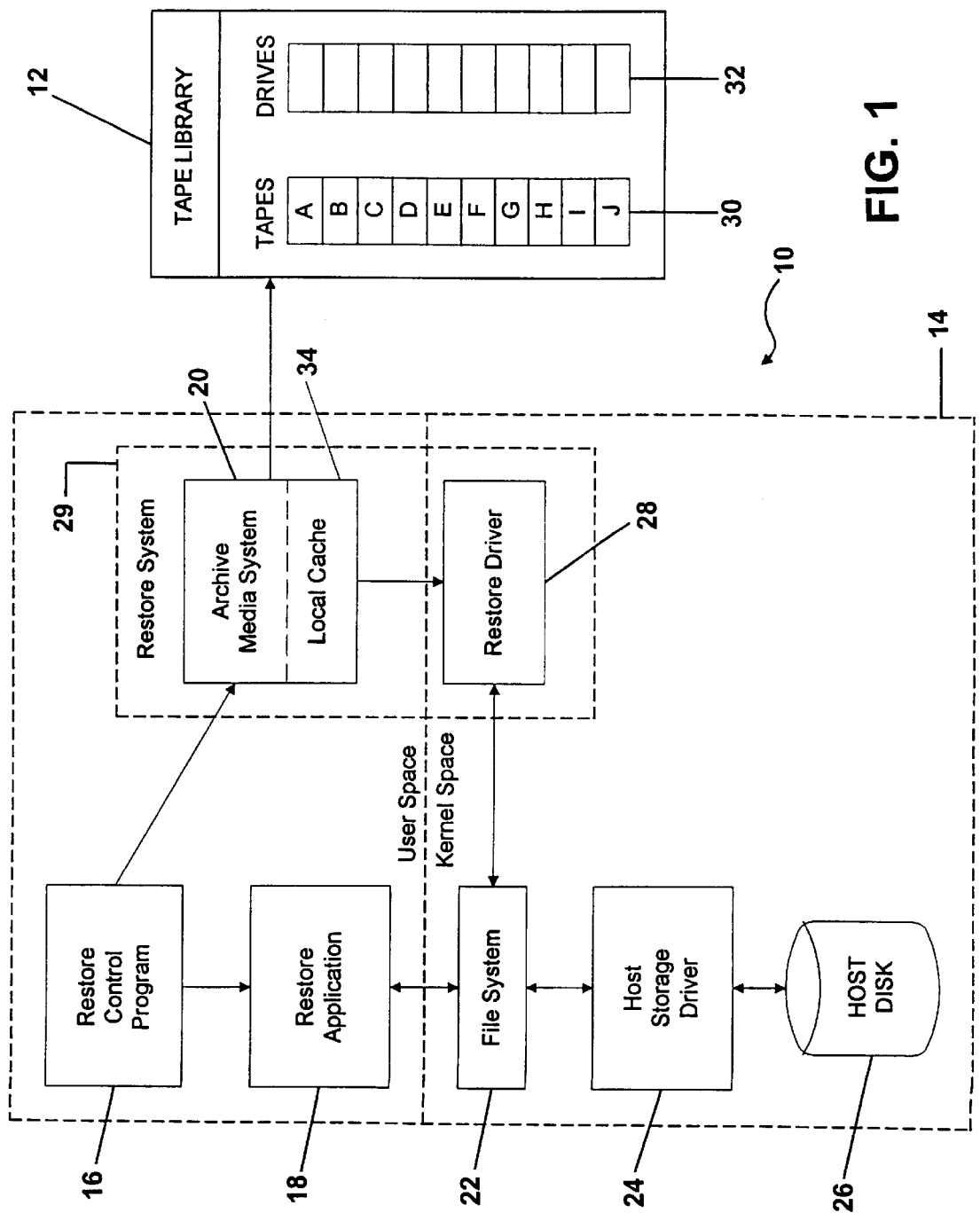
FIG. 1 is a block diagram of a system for restoring data backed up on archive media.

FIG. 1 shows system 10 for restoring data backed up on archive media, shown here as tape library 12, though other archive media can be employed. System 10 is implemented on desktop computer 14. Computer 14 includes restore control program 16, restore application 18, and archive media system 20 in the user application space of the computer. As also shown in FIG. 1, computer 14 includes file system 22 (e.g., the file system present in a UNIX operating system), host storage driver 24, and restore driver 28 in the kernel space of the computer, and host disk 26. Archive media system 20 is connected to communicate with external tape library 12 either through a direct connection or a network connection. Restore driver 28 and archive media system 20 together make up restore system 29.

File system 22, host storage driver 24, and host disk 26 are common components of a computer. File system 22 and host storage driver 24 are provided in the operating system of a computer, and disk 26 is the physical media on which the data are actually stored. A "block" of data (which might be 512 or 1,000 (1K) bytes or larger depending on the computer and the media type) is the smallest set of data that can be accessed on the physical media (e.g., disk 26). File system 22 carries out a logical to physical mapping; given a file name, it accesses file tables to determine where the file is actually physically located and converts a file name to a set of physical blocks. The file tables, which are stored along with actual data on disk 26, identify, for each file name, the starting block and the number of blocks in the file.

Tape library 12 includes a plurality of tapes 30, drives 32 to access the tapes, and a robot (not shown) to move tapes into drives. E.g., tapes A and B could store the backup from Monday; tapes C and D could store the backup from Tuesday, and so on. If one needs to access the data backed up on Monday, tapes A and B would be accessed by the appropriate drive 32. The data backed up in a physical level backup of disk 26 include the file tables used by file system 22 to correlate file names with physical blocks.

Restore application 18 is under the control of restore control program 16. Restore application 18 identifies a file to be restored as an input file and an output file, and causes the input file to be copied to the output file. E.g., "restore\test.dat" could be the file name for the file "test.dat" stored on archive media; "host\test.dat" could be the file name for the same file stored on host disk 26, and the following set of instructions in restore application 18 would cause the file stored on the archive media to be copied into host disk 26:

```
A=(restore†test.dat)
B=(host†test.dat)
open (A)
open (B)
while (there is data to be read from A)
    read (A)
    write (B)
close (A)
close (B)
```

The open A instruction opens a file in file system 22 and causes file system 22 to communicate with restore driver 28. That file is the input file. The open B instruction opens up another file in the file system 22 that causes it to communicate with host storage driver 24. That file is the output file. The data for the input file resides in the archive media (i.e., tape library 12), and the destination of the output file is host disk 26. The read and write instructions cause the input file to be copied to the output file.

Restore control program 16 controls restore application 18 and archive media system 20. When presented with a user request for a given file from a certain day, referred to as "target data" herein, restore control program 16 determines from stored information the set of tapes 30 that need to be loaded in the tape library 12 to enable the restore to happen. For example, if the user request was to restore the "text.dat" file as it was backed up on Monday, restore control program 16 would determine that tapes A and B need to be loaded, as noted above in the discussion of tape library 12. Restore control program 16 would then communicate with archive media system 20 to inform it that tapes A and B need to be loaded for access by appropriate drives 32. Once the tapes have been loaded into the tape drives, restore control program 16 issues a mount request to file system 22 to mount restore driver 28. Restore control program 16 also starts up restore application 18 telling it what file (e.g., "test.dat") to actually restore.

Figure 4:
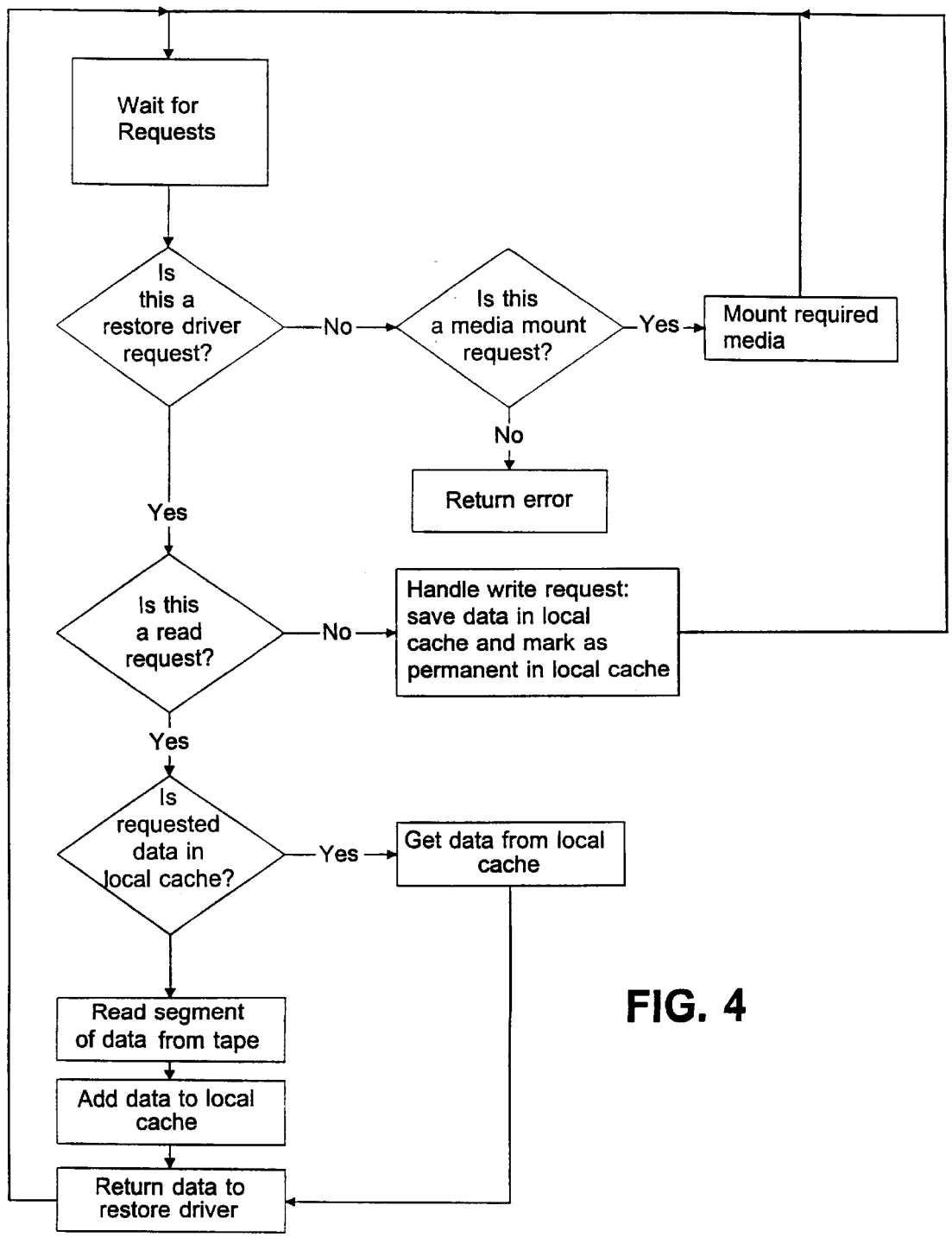
FIGS. 4 and 5 are flow charts showing the steps employed by an archive media system and a restore driver, respectively, of the FIG. 1 system.

Archive media system 20 is under the control of restore control program 16, processes both read and write requests, and has local cache 34 for storing any data to be written. FIG. 4 is a flow chart showing the steps employed by archive media system 20. When archive media system 20 receives the identity of tapes to be accessed for a restore from restore control program 16, it sends a request to tape library 12 to load the appropriate tapes and waits for restore driver 28 to make requests. When a write occurs, given that the archive media in tape library 12 is read only, the blocks are stored in local cache 34. When a read occurs, archive media system 20 first looks in local cache 34 to see if it has the requested blocks; if it does, it reads the requested blocks from local cache 34. If the local cache does not have the requested data blocks, which would occur most of the time, archive media system 20 goes to the tape library 12, reads the necessary blocks or segment of data from the appropriate tape, adds or stores the data in the cache and returns the blocks that were read to restore driver 28.

Figure 5:
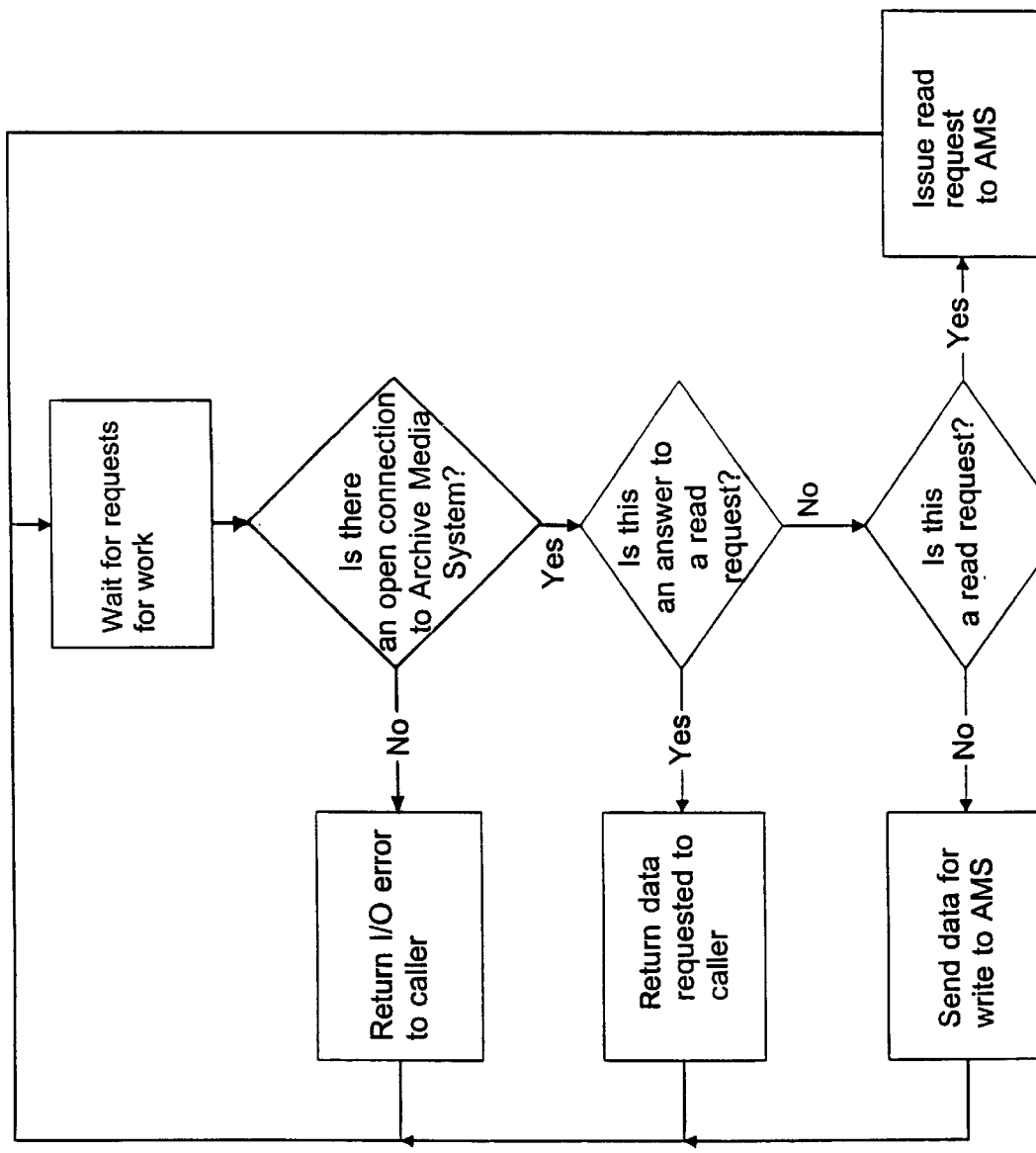

Restore driver 28 has an operating system device driver application programming interface to archive media system 20. In a UNIX operating system environment, archive media system 20 and restore driver 28 can communicate via IOCTL messages, which have the following format: (operation, address of a given buffer, optional arguments). FIG. 5 is a flow chart showing the steps employed by restore driver 28. When first started up, archive media system 20 makes an IOCTL call to restore driver 28; there would initially not be a return of the call, because there would not be any requests to process. Restore driver 28 initially waits for requests for work. When there is work, restore driver 28 first checks that there is an open connection to archive media system 20; if not, an I/O error is returned to the caller. If there is an open connection to archive media system 20, the restore driver determines if this is an answer to a read request, then the requested data are returned to the caller. If it is not an answer to a read request, the restore driver determines if it is a read request. If so, a read request is issued to archive media system 20; if it is not a read request, then it is a write, and the data are sent for a write to archive media system 20. When there is a pending request, the IOCTL call is returned by restore driver 28, and archive media system 20 looks at the return values of the IOCTL, which specify whether the operation is a read or write, and the starting block number. In addition, if the operation is a read, the return includes the number of blocks; if the operation is a write, the return includes the data being written. In a read operation, archive media system 20 goes to tape library 12 (or other archive media), gets the data, and then makes another IOCTL call to restore driver 28 to pass on the results of the read request. This IOCTL call passes back the starting block, the number of blocks, and the data. Archive media system 20 then sends another IOCTL call and waits for restore driver 28 to return the IOCTL return when there is another request to process.

Restore driver 28 has a disk driver interface to file system 22 and thus looks like a disk driver to file system 22, but its function is to communicate with archive media system 20 and to get the blocks of information specified by file system 22. File system 22 thus identifies to restore driver 28 the physical blocks that it wants. Once a read request specifying a particular block of a file is passed from file system 22, restore driver 28 then communicates a return of the IOCTL call (see discussion above) to archive media system 20. Restore driver 28 then returns the data to file system 22.

In operation, when a restore request is initiated at restore control program 16 to, e.g., restore a single file, a directory, or other group of files that had been backed up on a particular day (the target data), restore control program 16 identifies the set of tapes 30 needed for that day in tape library 12 and passes that information to archive media system 20 for access by appropriate drives 32. The file name is passed to restore application 18, which then issues the appropriate files to open and copy to file system 22. File system 22 then opens the appropriate output file on host disk 26 via host storage driver 24, and opens the appropriate input file. In determining the starting block and number of blocks for the input file, file system 22 accesses the appropriate file table that had been stored on host disk 26 and copied in the physical level backup copy to tapes 30. File system 22 is able to convert this to the physical location of the blocks on the tapes by using the mapping information that had been previously stored. File system 22 communicates with restore driver 28 to obtain the data beginning at a starting block and continuing for a number of blocks as if restore driver 28 were a conventional host storage driver. Restore driver 28 then passes the information on the starting block and number of blocks as return values in a return IOCTL message to archive media system 20. Archive media system 20, which had already initiated access to the appropriate tape 30 and tape drive 32, now passes on the block and number of block information to obtain access of the actual target data, obtains the data, and returns the data to restore driver 28. Restore driver 28 then returns the data to file system 22 for writing into disk 26.

Every time that archive media system 20 gets a read request, it needs to find the information requested and send it back to the restore driver 28. If archive media system 20 actually read from the tape each time to satisfy a request, then response time would be slow. To speed up the response time, archive media system 20 reads a larger amount of information than was requested. For example, if the read request was for a 1K block of information, archive media system 20 would read 1,000,000 (1 meg) bytes of information. This extra information is saved in cache 34. Whenever a read request is received, archive media system 20 first looks for the information in cache 34 before going to read it from tape. This provides for a much faster response time. Since the objective of the restore driver 28 is to restore archived information, the patterns of the reads are typically serial. When a file is being restored, all the blocks of the file are going to be read in a serial manner from block 1 to the last block of the file. File system 22 tries to optimize input/output (I/O) by clustering related data near each other. This allows the read request to execute a "read-ahead," or read extra information from near the same location, and the probability of reading the next block of information that will be requested is high.

Figure 2:
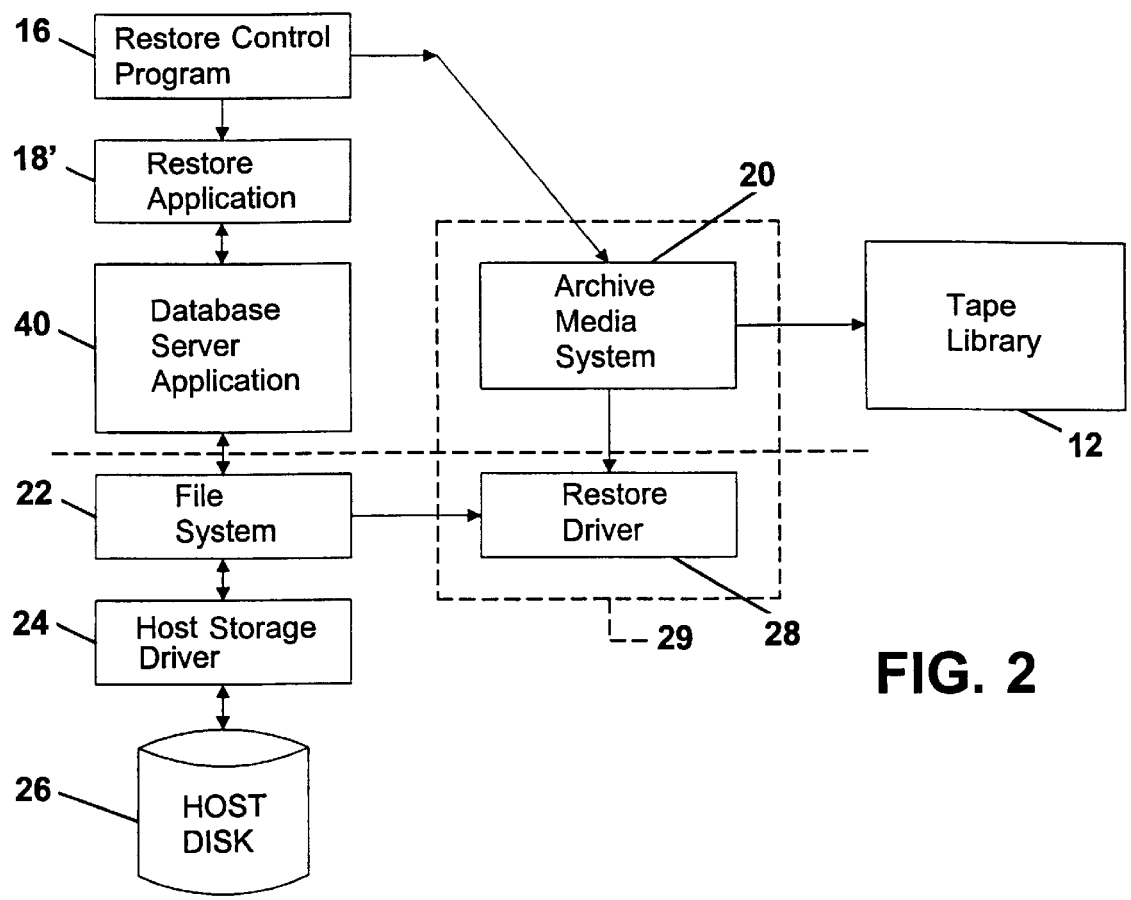
FIGS. 2 and 3 are block diagrams of alternative embodiments of systems for restoring data backed up on archive media.

FIG. 2 shows an alternative embodiment involving data base server application 40 interposed between restore application 18' and file system 22. The reference numbers used in FIG. 1 are used for like components in FIG. 2, and abbreviations are used for elements that already appear on FIG. 1. In the system shown in FIG. 2, data base server 40 is running on file system 22. Data base server 40 has created a file for running the data base. The data base accesses data based on tables, rows, and columns, whereas a file system accesses data based on file names and bytes of information in the file. With data base server application 40, there essentially is another level of mapping. In the system shown in FIG. 2, restore application 18' now communicates with data base server application 40, e.g, through structured query language (SQL), which in turn translates the requests prior to passing them on to file system 22. E.g., if restore application asks for row 1 of table A in a data base, data base server application 40 converts row 1 in table A to the appropriate block of a file, e.g., logical block 12 of a file named "database A".) File system 22 receives a read request for logical block 12 of file "database A," and converts that to the physical level, e.g., physical block 1000 of the physical media. The target data are then obtained by the same procedure as has already been described for FIG. 1. Restore driver 28 returns physical block 1000 to the file system 22, which returns logical block 12 of the file "database A," the original request, back to database server application 40. Database server application 40 now decodes the information inside that block and returns the first row back to the restore application 18'.

Figure 3:
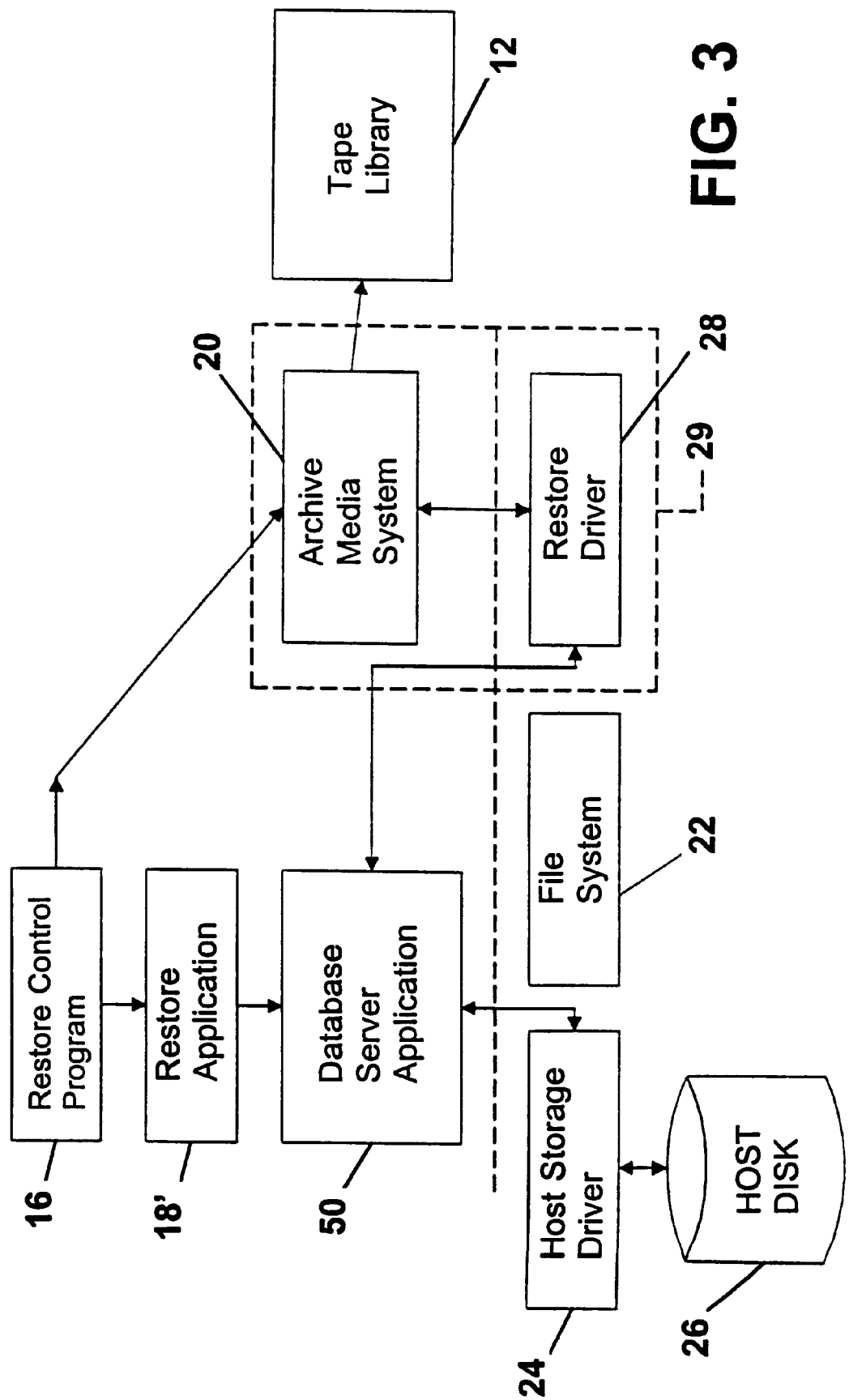

FIG. 3 shows a system with database server application 50, which does not operate with a file system but instead directly does logical to physical mapping on a so-called raw partition that bypasses file system 22 and communicates directly with the drivers. Examples of such database server applications are commercially available ORACLE (Redwood City, Calif.), INFORMIX (Menlo Park, Calif.) or SYBASE (Emeryville, Calif.) applications. Data base server application 50 thus makes the full mapping from a request for the first row all the way down to the physical level. E.g., if restore application 18' requests the first row, then data base server application 50 maps the request all the way down to physical block 1000 of the media and it makes the request directly to restore driver 28.

The invention permits one to obtain the benefits of physical level backup at raw physical speeds but allows restores of a subset of backed up data, e.g., a single file, directory, or other group of files, or a single database table, or even a single row or a single column within a row. In the FIGS. 1 and 2 systems, the computer's file system is used to do the physical to logical mapping, permitting the approach to be portable across operating systems with different internal implementations and different operating systems. In the FIG. 3 system, the database server application is used to do the physical to logical mapping, similarly permitting the approach to be portable across different database server applications.

Other embodiments of the invention are within the scope of the appended claims.

E.g., the restore driver can be designed to do the reading directly from the tape library or other archive media, though this will complicate the design of the restore driver and make it harder to implement on a large number of systems. Also, the restore control program and restore application can be combined.

The invention could be applied to various computers, e.g., a desktop computer (i.e., a workstation), a server level computer, or a mainframe computer, and to other conventional archive media, e.g., optical media.

I claim:

1. A computer having restore capabilities for data backed up on archive media, said computer comprising a restore application which identifies target data to be restored from said archive media and makes logical user read and write requests, an interpreter that maps said logical user read and write requests to physical block level read and write requests, a host storage driver having a disk driver interface for receiving said physical block level read and write requests from said interpreter, a host storage disk connected to be controlled by said host storage driver, said host storage driver generating disk control signals to read and write blocks of data from said host storage disk in response to said physical block level read and write requests, and a restore system having a disk driver interface to said interpreter for receiving the physical block level read requests from said interpreter, said restore system issuing instructions to read data from said archive media at a block, physical level and returning the data read from said archive media to said interpreter.

2. The computer of claim 1 wherein said interpreter comprises a database server application.

3. The computer of claim 1 wherein said interpreter comprises a file system of an operating system of said computer.

4. The computer of claim 3 wherein said restore application issues instructions to said file system to open an input file for said target data on said archive media, to open an output file for said target data on said host disk, and to copy the input file to said output file.

5. The computer of claim 1 wherein said restore system includes a restore driver and an archive media system, said restore driver providing said disk driver interface of said restore system and also having an operating system device driver application programming interface to said archive media system, said archive media system being implemented in user space of said computer and communicating with said archive media, said archive media being external to said computer.

6. The computer of claim 5 further comprising a restore control program that identifies the archive media on which said target data are located and communicates this information to said archive media system.

7. The computer of claim 5 wherein said archive media system and said restore application communicate via IOCTL messages.

8. The computer of claim 5 wherein said archive media system communicates with archive media comprising a tape library.

9. The computer of claim 5 wherein said archive media system has a local cache for storing data from said archive media.

10. The computer of claim 9 wherein said local cache also stores data written to it from said restore driver.

11. A computer implemented method of restoring data backed up from a computer on archive media, said method comprising identifying target data to be restored from said archive media at a restore application on said computer, making logical user read and write requests at said restore application to copy said target data from said archive media to a host storage disk controlled by a host storage driver, mapping said logical user read and write requests to physical block level read and write requests at an interpreter of said computer, receiving said physical block level read requests from said interpreter at a restore system having a disk driver interface to said interpreter, said restore system issuing instructions to read data from said archive media at a block, physical level and returning the data read from said archive media to said interpreter, and writing the data read from said archive media on said host storage disk.

12. The method of claim 11 wherein said interpreter comprises a database server application.

13. The method of claim 11 wherein said interpreter comprises a file system of an operating system of said computer.

14. The method of claim 13 wherein said logical user read and write requests made by said restore application include instructions to said file system to open an input file for said target data on said archive media, to open an output file for said target data on said host disk, and to copy the input file to said output file.

15. The method of claim 11 wherein said restore system includes a restore driver and an archive media system, said restore driver providing said disk driver interface of said restore system and also having an operating system device driver application programming interface to said archive media system, said archive media system being implemented in user space of said computer and communicating with said archive media, said archive media being external to said computer.

16. The method of claim 15 further comprising identifying the archive media on which said target data are located and communicating this information to said archive media system using a restore control program.

17. The method of claim 15 wherein said archive media system and said restore application communicate via IOCTL messages.

18. The method of claim 15 wherein said archive media system communicates with archive media comprising a tape library.

19. The method of claim 15 further comprising storing data from said archive media in a local cache of said archive media system.

20. The method of claim 19 further comprising storing data written to said archive media system from said restore driver in said local cache.

21. A computer program for implementation on a computer to restore data backed up from said computer on archive media, said computer program residing on a computer-readable medium, said computer having an interpreter that maps logical user read and write requests to physical block level read and write requests, a host storage driver having a disk driver interface for receiving said physical block level read and write requests from said interpreter, a host storage disk connected to be controlled by said host storage driver, said host storage driver generating disk control signals to read and write blocks of data from said host storage disk in response to said physical block level read and write requests, said computer program comprising instructions causing said computer to create a restore application which identifies target data to be restored from said archive media and makes said logical user read and write requests to said interpreter, and a restore system having a disk driver interface to said interpreter for receiving said physical block level read requests from said interpreter, said restore system issuing instructions to read data from said archive media at a block, physical level and returning the data read from said archive media to said interpreter.

22. The computer program of claim 21 wherein said interpreter comprises a database server application.

23. The computer program of claim 21 wherein said interpreter comprises a file system of an operating system of said computer.

24. The computer program of claim 23 wherein said restore application issues instructions to said file system to open an input file for said target data on said archive media, to open an output file for said target data on said host disk, and to copy the input file to said output file.

25. The computer program of claim 21 wherein said restore system includes a restore driver and an archive media system, said restore driver providing said disk driver interface of said restore system and also having an operating system device driver application programming interface to said archive media system, said archive media system being implemented in user space of said computer and communicating with said archive media, said archive media being external to said computer.

26. The computer program of claim 25 further comprising a restore control program that identifies the archive media on which said target data are located and communicates this information to said archive media system.

27. The computer program of claim 25 wherein said archive media system and said restore application communicate via IOCTL messages.

28. The computer program of claim 25 wherein said archive media system communicates with archive media comprising a tape library.

29. The computer program of claim 25 wherein said archive media system has a local cache for storing data from said archive media.

30. The computer program of claim 29 wherein said local cache also stores data written to it from said restore driver.

* * * * *